United States Patent
Eick et al.

(10) Patent No.: US 9,217,798 B2
(45) Date of Patent: Dec. 22, 2015

(54) CONSTANT ENERGY DISPLACEMENTS

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 413 days.

(21) Appl. No.: 13/874,109

(22) Filed: Apr. 30, 2013

(65) Prior Publication Data

US 2013/0308422 A1     Nov. 21, 2013

Related U.S. Application Data

(60) Provisional application No. 61/640,384, filed on Apr. 30, 2012.

(51) Int. Cl.
| | |
|---|---|
| *G01V 1/155* | (2006.01) |
| *G01V 1/09* | (2006.01) |
| *G01V 1/145* | (2006.01) |
| *G01V 1/24* | (2006.01) |
| *G01V 1/18* | (2006.01) |
| *G01V 1/00* | (2006.01) |
| *G01V 1/047* | (2006.01) |
| *G01V 1/143* | (2006.01) |

(52) U.S. Cl.
CPC ............... *G01V 1/145* (2013.01); *G01V 1/005* (2013.01); *G01V 1/006* (2013.01); *G01V 1/047* (2013.01); *G01V 1/143* (2013.01); *G01V 1/18* (2013.01); *G01V 1/24* (2013.01)

(58) Field of Classification Search
CPC ....... G01V 1/09; G01V 1/143; G01V 1/1047; G01V 1/147; G01V 1/145; G01V 1/155
USPC .......................................... 181/111, 114, 121
See application file for complete search history.

(56) References Cited

U.S. PATENT DOCUMENTS

| | | | | |
|---|---|---|---|---|
| 2,675,882 | A | * | 4/1954 | Bazzoni et al. ............... 181/111 |
| 2,920,306 | A | | 4/1954 | Feagin et al. |
| 3,339,139 | A | | 8/1967 | Lee et al. |
| 3,430,193 | A | | 2/1969 | Lindsey et al. |
| 3,777,843 | A | * | 12/1973 | Fair et al. ...................... 181/114 |
| 3,979,715 | A | | 9/1976 | Hufstedler et al. |
| 4,042,910 | A | | 8/1977 | Rietsch |
| 4,064,481 | A | | 12/1977 | Silverman |
| 4,114,722 | A | * | 9/1978 | Weber et al. .................. 181/114 |
| 4,133,409 | A | * | 1/1979 | Mifsud et al. ................. 181/114 |
| 4,372,420 | A | * | 2/1983 | White ............................ 181/120 |
| 4,458,777 | A | * | 7/1984 | Weber et al. .................. 181/121 |
| 4,651,044 | A | * | 3/1987 | Kompanek ............... 310/323.17 |

(Continued)

*Primary Examiner* — Ari M Diacou
(74) *Attorney, Agent, or Firm* — ConocoPhillips Company

(57) ABSTRACT

An electric sweep type seismic vibrator source of the type used in seismic prospecting for hydrocarbons is provided. In one example, the source uses an engine and generator combination to create electric power for all systems on the source such as driving a frame of linear electric motors that direct a rod or piston to contact the ground in a recurring fashion along with driving the source from location to location through a survey area. A foot is arranged on the bottom end of the rod or piston for contact with the ground and by engaging the grid of motors to push down against the ground in a rapid progression, acoustic energy is created and delivered into the ground for geophones to sense and record.

8 Claims, 2 Drawing Sheets

(56) References Cited

U.S. PATENT DOCUMENTS

| | | |
|---|---|---|
| 4,766,576 A | 8/1988 | Sallas et al. |
| 4,823,326 A | 4/1989 | Ward |
| 4,853,906 A * | 8/1989 | Cole ............................ 367/189 |
| 5,347,494 A | 9/1994 | Andersen |
| 5,614,670 A * | 3/1997 | Nazarian et al. ................ 73/146 |
| 5,991,235 A | 11/1999 | Allen |
| 6,891,776 B2 | 5/2005 | Moerig |
| 7,657,350 B2 * | 2/2010 | Moran ............................ 701/22 |
| 7,841,444 B2 * | 11/2010 | Cannell et al. ................ 181/121 |
| 8,256,565 B2 * | 9/2012 | Pabon et al. ................... 181/104 |
| 2003/0168277 A1 * | 9/2003 | Hopperstad et al. .......... 181/111 |
| 2010/0232260 A1 * | 9/2010 | Zowarka et al. .............. 367/189 |
| 2011/0209940 A1 * | 9/2011 | Daraio ........................... 181/139 |
| 2012/0037444 A1 * | 2/2012 | Eick et al. ..................... 181/114 |
| 2013/0155817 A1 * | 6/2013 | Kim ............................... 367/189 |

\* cited by examiner

CONSTANT ENERGY DISPLACEMENTS

CROSS-REFERENCE TO RELATED APPLICATIONS

This application is a non-provisional application which claims benefit under 35 USC §119(e) to U.S. Provisional Application Ser. No. 61/640,384 filed Apr. 30, 2012, entitled "CONSTANT ENERGY DISPLACEMENTS," which is incorporated herein in its entirety.

STATEMENT REGARDING FEDERALLY SPONSORED RESEARCH

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Over the years, the preferred attributes of the seismic energy delivered into the earth have been honed to include a broad spectrum of wavelengths and sufficient power across the spectrum to be recorded at the surface. In general, a suitable land source must be able to deliver seismic energy waves in a spectrum of wavelengths from about 8 Hz up to 60-80 Hz. The source must have sufficient power across the spectrum so that the seismic waves have measurable amplitude at the surface after transiting deep into the earth, reflecting from or refracting through layers in the earth and transiting back to the surface. A last major characteristic of a desirable seismic source is that the energy from the source is distinguishable in the data record from seismic energy from other sources whether from background sources or other seismic prospecting.

Explosive charges have long been used as seismic sources although the intense release of energy is typically not permitted except in remote locations. Explosive sources, however, provide a wide array of wavelengths with considerable power across the wavelengths.

Hydraulic reciprocating seismic vibrators or vibes have been in use for many years using a baseplate connected to hydraulic rams that cause a reaction mass to reciprocate up and down to shake the ground through the baseplate. The hydraulic rams are operated to move the reaction mass through a sweep of the desired frequencies. However, the hydraulic systems are limited in their ability to provide sufficient power at high frequencies due to limitations of hydraulic flow in and out of the hydraulic cylinders. At very high hydraulic velocities, the hydraulic fluid is subject to cavitation effects when reversing directions that limits the amplitude of the movement of the reaction mass and thus the energy input in to the earth. At low frequencies it is difficult for the hydraulic vibe to have enough travel to generate a low frequency wave into the ground. For example, consider how one would generate a one Hz wave with a hydraulic vibe. A very long throw of the reaction mass is needed to generate that wavelet because the mass has to be moving down and up the full one second.

BRIEF SUMMARY OF THE DISCLOSURE

The invention more particularly relates to a process for delivering acoustic energy into the earth for seismic prospecting wherein an electrically powered seismic source is provided that has a plurality of linear electric motors where a ground contact element of each linear electric motor is arranged to be provided in contact with the ground. The ground contact element of each linear electric motor is put into contact with the ground and the linear electric motors are actuated to repeatedly and forcefully press against the ground deflecting the ground and thereby deliver acoustic energy to the ground and into the earth as a sweep. The sweep is characterized as having a core frequency spectrum from about 15 Hz to at least about 40 Hz where the ground deflection is substantially consistent across the core frequency spectrum.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
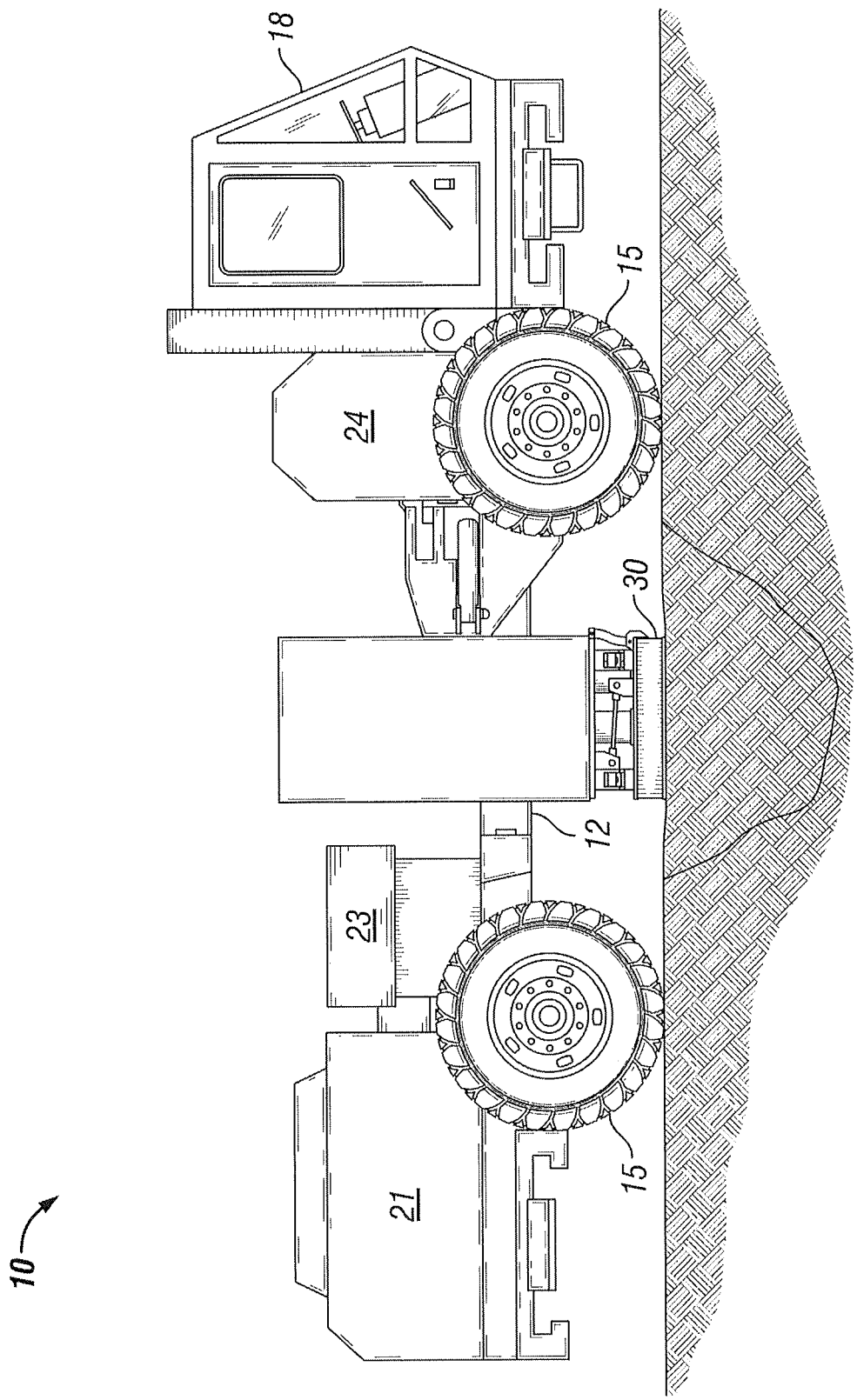
FIG. 1 is an elevation view of a discrete electric seismic source unit.
Figure 2:
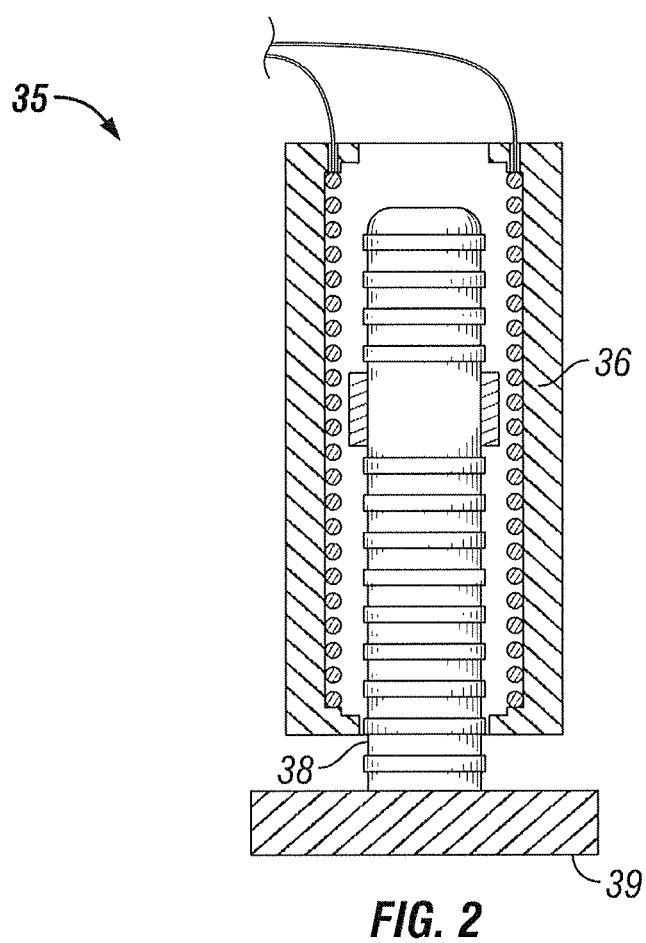
FIG. 2 is an enlarged fragmentary view of an electromechanical linear motor assembly for delivering seismic energy into the ground.
Figure 3:
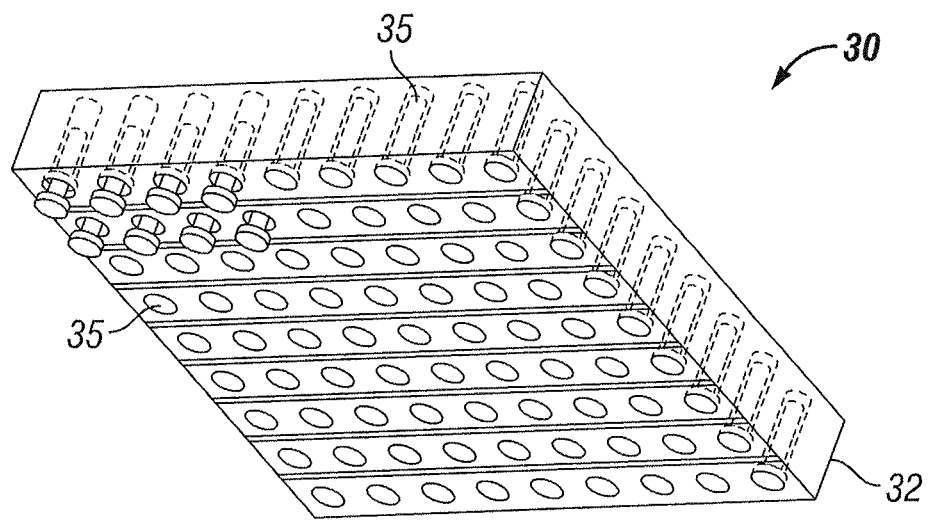
FIG. 3 is an enlarged perspective fragmentary view of a grid of electro mechanical linear motor assemblies for cooperatively delivering seismic energy into the ground.

As shown in FIG. 1, an alternative vibrator actuator source 10 is shown comprising a chassis 12, four wheels 15 and a driver's cab 18. The alternative vibrator actuator source 10 uses a diesel engine 21 to turn an electric generator 23 and uses electric power to power the source 10 both for delivering acoustic energy into the ground and for moving along the ground from location to location. The source 10 utilizes electricity for all of its power needs. A large battery 24 is included to store energy for high situations of high electrical demand or when there are problems with the generator 23, but the battery 24 provides the power to return to a location for repair. Referring now to FIGS. 2 and 3, the acoustic energy delivery system 30 is carried under the chassis 12 and comprises a frame 32 that carries a number of linear motors 35. Each linear electric motor 35 includes a tubular body 36 and a rod or actuation bar 38 positioned within the tubular body 36 that extends telescopically from the lower end of the tubular body 36. A replaceable foot 39 is attached to the bottom end of the rod 38 for contacting the ground. The frame 32 includes mounts for a grid of linear motors 35.

In the preferred embodiment approximately 112 linear motors 35 are arranged in a grid of perhaps 8 by 14.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground G and thereby deliver an impulse into the earth. The linear motors 35 are quickly operated to recoil the rods 38 without disengaging contact with the ground G by the replaceable feet 39. By successive thrusts and recoils, a sweep of acoustic energy may be effectively delivered into the Earth while the feet remain in contact with the ground G. While simple progressive sweeps were originally envisioned for this new type of seismic source, the flexibility and responsiveness of linear electric motors substantially broadens limits on how to deliver a spectrum of frequency over a period of time. Traditionally, a seismic vibrator delivers a sweep of seismic energy beginning at a low frequency and progressively increases the frequency up to a maximum frequency over a set time such that it could be charted on a time frequency chart as a straight line. With new found freedom, very creative sweeps may be delivered such that high frequencies, low frequencies and intermediate frequencies may be delivered in a unique and highly distinctive manner. For example, a left to right sweep forming a wave could easily be constructed to make shear waves, a trumpet bell like sweep could be constructed to focus the downgoing wave into a linear plane wave or similar sweeps could be created from the many individual components of the combinations of the linear motors. At the moment, the only limitations are that the cumulative time at any one frequency should be consistent across the spectrum and the sweep should fully populate the entire spectrum. This new capability enables the delivery of seismic energy into the ground in a manner such that the earth is deflected by the same amount at all frequencies. To clarify, in the preferred embodiment of the invention is the concept that the particle motion amplitude resulting from the deflection of the earth by the vibrator source is constant or consistent for all frequencies.

The characteristics of standard hydraulic vibrator seismic sources has been a topic of research for many years. By the use of load cell sensors and tiles along accelerometer sensors the motion of the standard hydraulic vibrator seismic sources' base plate during various sweep frequency ranges has been extensively analyzed. The findings indicate that the amplitude of the particle motion resulting from the hydraulic vibrator decreases as the frequency increases. This is the result of the hydraulic system being unable to maintain the required motion to cause a constant particle motion amplitude at the ground surface or of the captured mass. The problem is one of horsepower and basic physics of the hydraulic system. At low frequencies the acceleration of the baseplate in an up and down motion is relatively low, so a reasonable displacement of the ground can be achieved. At high frequencies, the acceleration of the baseplate must be very high to move the plate up and down the same amount of displacement of the ground as in the low frequency situation. This acceleration exceeds the capability of a hydraulic system because you cannot make the fluid change direction quickly enough without cavitation effects.

We have noted that the amplitude of a pressure wave generated by a seismic vibrator is the direct result of the amplitude of the up and down motion of the vibrator base plate. It is then required that the amplitude of the up and down motion created by the acoustic energy delivery system 30 as it contacts the ground G must be similar for all frequencies if the amplitude of the particle motion is to be similar for a frequencies. Thus, in the preferred embodiment of the invention the acoustic energy delivery system 30 which utilizes electric linear motors 35 to impart acoustic seismic energy into the ground is controlled in a manner such that the amplitude of the up and down motion of the electric linear motors is uniform for all frequencies of motion so that uniform displacement of the ground G is achieved. So, for a geophysicist that is to design a seismic survey for a drilling prospect, the present invention provides a tool for deflecting the ground at all of the source points where the deflection may be substantially consistent across the frequency spectrum the geophysicist decides.

For a minimum frequency spread or core frequency spectrum of from about 15 Hz to 40 Hz, ground deflection imparted by the source 10 may be substantially consistent.

While broad frequency spectrums are most desired in any seismic survey, there are common limitations at the ends of the spectrums. Core frequency spectrums may also start at 8 Hz, 6 Hz or as low as 2 Hz and extend up to 50 Hz, 60 Hz, 80 Hz and may extend up to 120 Hz and even higher. Ideally, the ground deflection at the high end of the core frequency would be at least fifty percent or higher as compared to the low end of the core frequency spectrum. The control system on the alternative vibrator actuator source 10 determines the motion of the electric linear motors 35 that is needed to assure uniform thrust as the ground G conditions change with the imparted frequency sweep. By the use of feedback circuits the control system assures that all the electric linear motors 35 contained in the acoustic energy delivery system 30 are imparting coherent acoustic energy with a uniform particle motion, displacement, for all frequencies of acoustic energy being imparted in to the earth G.

It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 23. The impulses would be repeated in a sequence where the impulse would occur with progressively increasing or decreasing rapidity such that a progression of frequencies of impulse forces would effectively deliver acoustic energy into the earth. The acoustic energy being characterizable as a progressive sweep of frequencies covering a broad spectrum from about 1 Hz up to at least 80 Hz and preferably up to 120 Hz.

The electric linear motors 35, working in conjunction, would not suffer the limitations of the hydraulic pumping systems at high frequency. Applying and reversing electric power instantly to the linear motors 35 causes movement of the rods 38 within the tubular bodies 36, and the impulse frequency range is greatly expanded. By using electrical control circuits that are commonly available for diesel electric train locomotives and hybrid cars, the power can be applied instantly with a very high degree of control and stabilization.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 200, more than 200, possibly more than 2000 or less than 200 possibly less than 100, will be able to deliver high energy at high frequency. The size of the linear motors may be reduced or increased to adjust and adapt to ideal energy delivery system to create an optimal frequency range with high energy across the spectrum.

The selection of the specific linear motors IS an engmeenng Issue at production time because they can be sourced to have a large thrust force but with short strokes as compared to those that have longer strokes with less thrust, but higher speeds. As one embodiment of the invention, the frame 32 has approximately 112 linear motors 35 that are arranged in a grid of perhaps 8 by 14. Each linear motor is capable of outputting a peak acceleration force of approximately 2400 Newtons (N) or approximately 540 pounds-force while using 34 amps RMS (Arms) at 240 volts AC. The 112 linear motors would then be capable of outputting 268,800 N or 60,480 pounds-force using approximately 914 kilowatts of power. An array of 112 of these motors could operate in the space provided and would require approximately a 1225 Hp diesel electric motor and generator providing the prime mover power source.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for delivering acoustic energy into the earth for seismic prospecting, the process comprising:
   a) providing an electrically powered seismic source having about 100 to 5,000 linear electric motors carried by a frame where a ground contact element of each linear electric motor is arranged to be provided in contact with the ground;
   b) putting the ground contact element of each linear electric motor into contact with the ground; and
   c) actuating the linear electric motors to repeatedly and forcefully press against the ground deflecting the ground and thereby deliver acoustic energy to the ground and into the earth as a sweep where the sweep is characterized as having a core frequency spectrum from about 2 Hz to about 120 Hz where the ground deflection is substantially consistent across the core frequency spectrum.

2. The process for delivering acoustic energy into the earth according to claim 1, further including the step of lowering each of the rods to the ground and maintaining the lower ends of the rods in continuous contact with the ground as the acoustic energy is delivered into the earth.

3. The process for delivering acoustic energy into the earth according to claim 1, wherein the core frequency spectrum is between 8 Hz and 60 Hz and the ground deflection is near consistent across the core frequency spectrum.

4. The process for delivering acoustic energy into the earth according to claim 1, wherein the core frequency spectrum is between 8 Hz and 50 Hz and the ground deflection is near consistent across the core frequency spectrum.

5. The process for delivering acoustic energy into the earth according to claim 1, wherein the core frequency spectrum is between 6 Hz and 80 Hz and the ground deflection is near consistent across the core frequency spectrum.

6. The process for delivering acoustic energy into the earth according to claim 1 wherein the core frequency spectrum is between 15 Hz and 40 Hz and the ground deflection is near consistent across the core frequency spectrum.

7. The process for delivering acoustic energy into the earth according to claim 1, further including the step of receiving and recording the seismic energy returning to the surface of the earth.

8. The process for delivering acoustic energy into the earth according to claim 1, wherein the ground deflection at the higher frequency of the core frequency spectrum is at least 50 percent of the ground deflection at the low frequency end of the core frequency spectrum.

* * * * *